United States Patent
Ruf et al.

(10) Patent No.: US 9,329,070 B2
(45) Date of Patent: May 3, 2016

(54) APPARATUS FOR REDUCING OR MINIMIZING DISTURBANCE SIGNALS IN THE CASE OF A FIELD DEVICE OF PROCESS AUTOMATION

(75) Inventors: Klaus Ruf, Rheinfelden (DE); Marc Schlachter, Wehr (DE); Wolfgang Brutschin, Schopfheim (DE)

(73) Assignee: ENDRESS + HAUSER GMBH + CO. KG, Maulburg (DE)

( * ) Notice: Subject to any disclaimer, the term of this patent is extended or adjusted under 35 U.S.C. 154(b) by 547 days.

(21) Appl. No.: 13/260,634

(22) PCT Filed: Mar. 15, 2010

(86) PCT No.: PCT/EP2010/053278
§ 371 (c)(1),
(2), (4) Date: Sep. 27, 2011

(87) PCT Pub. No.: WO2010/112326
PCT Pub. Date: Oct. 7, 2010

(65) Prior Publication Data
US 2012/0022672 A1 Jan. 26, 2012

(30) Foreign Application Priority Data
Mar. 31, 2009 (DE) .......................... 10 2009 002 009

(51) Int. Cl.
*G05B 9/02* (2006.01)
*G01F 23/00* (2006.01)
(Continued)

(52) U.S. Cl.
CPC .............. *G01F 23/0023* (2013.01); *G01D 1/00* (2013.01); *G01D 15/00* (2013.01); *G01F 23/00* (2013.01); *G01F 23/0007* (2013.01); *G01F 23/161* (2013.01)

(58) Field of Classification Search
CPC ........ G05B 9/02; G05B 9/03; G05B 19/0428; G01R 19/0092; G01R 19/2513; G01R 21/133
USPC .............................................. 700/79; 702/64
See application file for complete search history.

(56) References Cited

U.S. PATENT DOCUMENTS 4,983,964 A    1/1991   Van De Pas
5,652,691 A *  7/1997   Fowler .......................... 361/155
(Continued)

FOREIGN PATENT DOCUMENTS

DE    3521899    1/1987
DE    3614832    11/1987
(Continued)

OTHER PUBLICATIONS

Williams, Tim: The Circuit Designer's Companion, Paperback Edition, News, Oxfort, Boston, Johannesburg, 1993.
(Continued)

*Primary Examiner* — Mohammad Ali
*Assistant Examiner* — Ziaul Karim
(74) *Attorney, Agent, or Firm* — Bacon & Thomas, PLLC

(57) ABSTRACT

An apparatus for reducing or minimizing disturbance signals in the case of a field device of process automation, wherein the field device has a control/evaluation unit and a sensor, with, respectively, at least one main electronics and at least one sensor electronics. At least one data line is provided, via which the main electronics and the sensor electronics communicate. At least one galvanic isolating component is provided, which is integrated into the at least one data line, and which prevents transmission of disturbance signals via the one or more data lines. Power supply lines are provided, via which a power supply voltage sufficient for operation of the sensor is made available to the sensor; and wherein, in the power supply lines, filter means are provided, which are designed in such a manner that predetermined requirements for disturbance resistance of the power supply lines are fulfilled.

9 Claims, 4 Drawing Sheets

(51) Int. Cl.
*G01D 1/00* (2006.01)
*G01D 15/00* (2006.01)
*G01F 23/16* (2006.01)

(56) References Cited

U.S. PATENT DOCUMENTS

| | | | |
|---|---|---|---|
| 6,684,340 B1 * | 1/2004 | Lubcke et al. | 713/300 |
| 6,930,609 B1 * | 8/2005 | Florenz et al. | 340/612 |
| 2006/0161359 A1 * | 7/2006 | Lalla | 702/65 |
| 2007/0068922 A1 * | 3/2007 | Westfield et al. | 219/447.1 |
| 2007/0247091 A1 * | 10/2007 | Maiocchi | 318/254 |
| 2008/0013226 A1 * | 1/2008 | Kirst | 361/18 |
| 2008/0147336 A1 | 6/2008 | Karbula et al. | |
| 2008/0180226 A1 * | 7/2008 | Schmidt | 340/286.01 |
| 2008/0267212 A1 | 10/2008 | Crawley et al. | |

FOREIGN PATENT DOCUMENTS

| | | |
|---|---|---|
| DE | 19730158 | 2/1999 |
| DE | 19954186 | 5/2001 |
| DE | 10220450 | 11/2003 |
| DE | 102007036580 | 2/2009 |
| EP | 1228494 | 8/2002 |
| GB | 2010020 | 6/1979 |
| WO | WO 91/13417 | 9/1991 |

OTHER PUBLICATIONS

Bruel & Kjaer Vibro GmbH: Allgemeine Erdungsempfehlung, 2006.
International Preliminary Report.

* cited by examiner

APPARATUS FOR REDUCING OR MINIMIZING DISTURBANCE SIGNALS IN THE CASE OF A FIELD DEVICE OF PROCESS AUTOMATION

TECHNICAL FIELD

The invention relates to an apparatus for reducing or minimizing disturbance signals in the case of a field device of process automation.

BACKGROUND DISCUSSION

The field device includes a control/evaluation unit having a main electronics, and a sensor having a sensor electronics. These are spatially separated from one another, and connected with one another via a connection means, usually a cable; alternatively, in the case of a compact device, the main electronics and the sensor electronics are arranged in one housing. The two electronics can be arranged on different circuit boards, or also on the same circuit board. Further provided are: at least one data line, via which the sensor and the control/evaluation unit communicate; and a power supply line, via which a power supply voltage sufficient for operation of the sensor is made available to the sensor.

The field device is preferably a fill level measuring device, a pressure measuring device, a flow measuring device or an analytical measuring device designed for purposes of analyzing a liquid or gaseous medium. This list is not, of course, intended to represent the limits of the definition; rather, with the term "field device" is meant a measuring device which makes available information concerning any physical or chemical, process variable.

The invention relates to cable probes, which are used when the measuring should be performed by means of a sensor—e.g. by means of a pressure sensor or a capacitive measuring probe—at a site which is not directly accessible externally. A typical example is the application of a probe/sensor at a certain height in a tank, or in some other container difficult to access from the outside. The connection means—that is the cable—serves for securement of the sensor in the container; via corresponding lines in the cable, the energy supply and the transmission of data between the evaluation unit and the sensor occur simultaneously.

From EP 1 228 494 B1, a corresponding apparatus for transmission of data between a sensor and an evaluation unit has been made known. Sensor and evaluation unit are separated from one another and have a certain spatial distance. Field devices embodied as cable variants are available from the firm, Endress+Hauser.

In order to eliminate disturbance/interference currents on the lines, the main electronics arranged in the evaluation unit and the sensor electronics located in the sensor are usually galvanically isolated from one another. For galvanic isolation of the lines, switching power supplies of different topology, such as push-pull converters, flyback converters or forward converters are used. In this way, the possibility exists to reduce possible interference currents in such a manner that the respective requirements of the EMC standards are fulfilled.

Problems become apparent in the case of galvanic isolation, when voltages of the same order of magnitude should be transmitted. A typical DC/DC transmission is, for example, the transforming of 3.3V to 3.3V: In this case, the efficiency is so small, or the power loss is so large that, among other things, the supplying of the field device with energy is no longer assured. This is problematic especially in the case of 4-20 mA field devices.

In EP 1 228 494 B1, reference is likewise made to the disturbance resistance of the transmission in the case of a cable variant of a field device. Here, interference removing means are placed in front of the outputs or the inputs of both processor units. The interference-removing means are low-pass filters, composed of a resistor and a capacitor, wherein the data lines are in each case grounded via the capacitor. The time constants of the RC members are selected in such a manner that, on the one hand, communication is not degraded, and, on the other hand, the coupling-in of interference is largely suppressed. Furthermore, the resistances are low ohm in such a way that an overly strong weakening of the signal level is prevented.

Disadvantageous in the case of the known solution is that it only enables a low frequency communication. Due to the lowpass arrangements, high-frequency communication is significantly degraded or completely impossible.

SUMMARY OF THE INVENTION

An object of the invention is to provide an apparatus which assures disturbance resistance of a field device even in the case of high data transmission rate ranges.

The object is achieved by the features that at least one galvanic isolating component is provided, which is integrated into the at least one data line and which prevents the transmission of disturbance signals over the data line, and that, in the power supply lines, filter means are provided, which are designed in such a manner that predetermined requirements for the disturbance resistance of the power supply lines are fulfilled.

The invention relates to a partial galvanic isolation. The power supply lines are not galvanically isolated; however, in the place of this, they are provided with a sufficiently strong filtering. Only the data lines are galvanically isolated. Via the relatively strong filtering of the supply voltage, the influence of interference currents can be minimized to the extent that the respective requirements for the ability of the lines to resist disturbances are fulfilled.

The data lines, in the case of which a correspondingly strong filtering leads to the loss of information, are galvanically isolated by means of measures known from the state of the art. In turn, the electrical components applied for the galvanic isolation are dimensioned in such a manner that the requirements for disturbance resistance are fulfilled. The solution of the invention permits a communication which is limited only by the limit frequencies of the used galvanic isolating components, such as optocouplers, etc. Thus, compared to the known state of the art—e.g. low-pass filtering—far higher data transmission rates are implemented, whereby the performance of the field device can be significantly improved. The measuring dynamic, and thus also the accuracy of measurement, especially, are significantly increased. Other advantages of the apparatus of the invention are that the material costs are smaller and that the constructed size of the galvanic isolating components is reduced.

An advantageous embodiment of the apparatus of the invention provides that the main electronics and the sensor electronics are spatially separated from one another and are connected with one another via a connection means, which usually is referred to as a cable. Alternatively, in the case of a compact device, the main electronics and the sensor electronics are arranged in one housing. In such case, the two can be arranged on different circuit boards, or also on the same circuit board.

In an advantageous embodiment of the apparatus of the invention, the filter means is a single stage filter or a multi-stage filter. The filter means is especially embodied as an electrical current compensated or non electrical current compensated choke.

Furthermore, an advantageous further development of the apparatus of the invention provides that a capacitor, or also a number of capacitors, is, in each case placed in front of and/or connected after the filter means. Thus, for example, an X-capacitor is provided before the choke and an X-capacitor is provided after the choke. In the power supply line VCC and in the ground line GND, a Y-capacitor is arranged in each case.

Moreover, it is provided that the filter means or the choke means are designed in such a manner that their corresponding resistance is minimal. It is especially assured that the corresponding voltage drops are in sum essentially smaller than the supply voltage made available by the control/evaluation unit.

The galvanic isolating components are, for example, optocouplers, inductive couplers, circuit board transformers, transformers. The one or more data lines are embodied in such a manner that they allow unidirectional and/or bidirectional data transmission between the control/evaluation unit and the sensor.

BRIEF DESCRIPTION OF THE DRAWINGS

The invention will now be explained in greater detail based on the appended drawing, the figures of which show as follows.

DETAILED DISCUSSION IN CONJUNCTION WITH THE DRAWINGS

Figure 1:
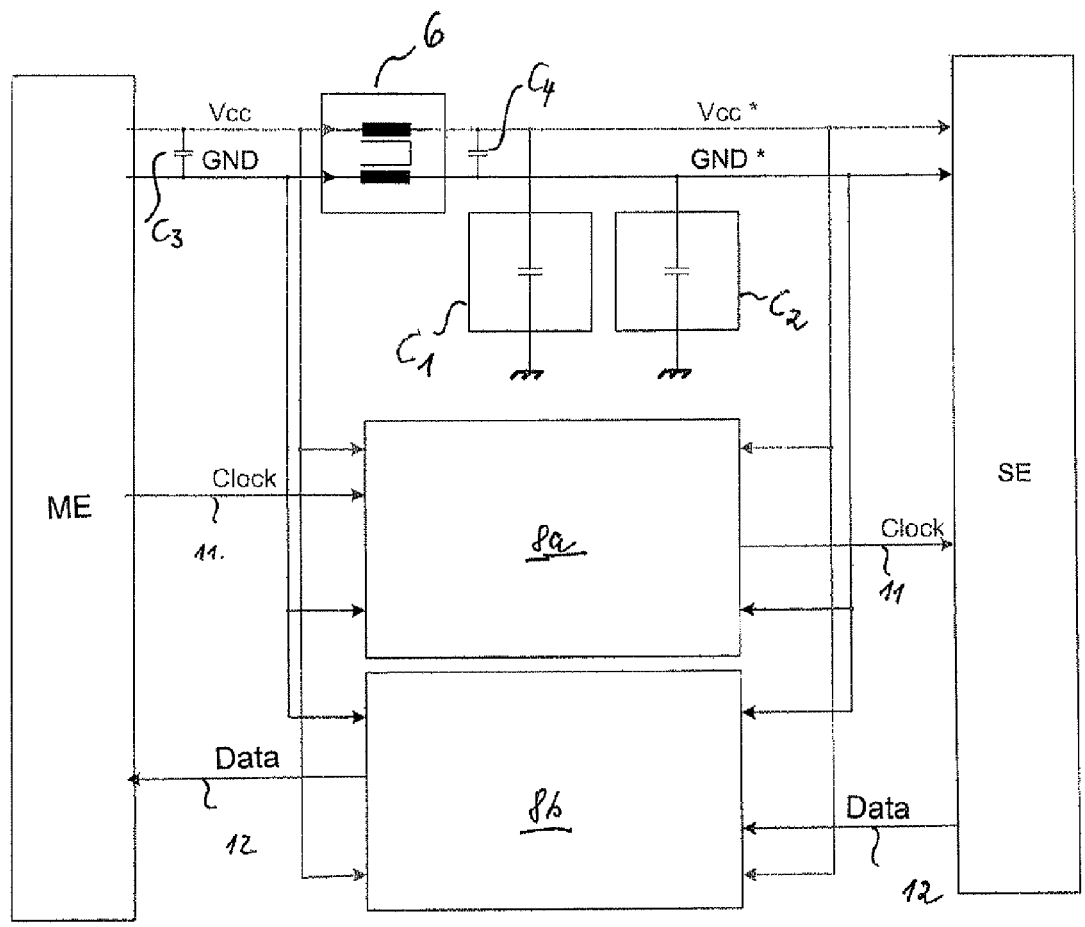
FIG. 1 is a block diagram of the apparatus of the invention.

FIG. 1 shows a block diagram of the apparatus of the invention for reducing or minimizing disturbance signals in the case of a field device 1 of process automation. The main electronics ME and the sensor electronics SE are connected with one another via supply lines VCC, GND and data lines 11, 12. Via the unidirectional data line 11, the main electronics provides the clock signal CLOCK, which triggers the data exchange via the data line 12. In the two data lines 11, 12, a galvanic isolating component 8a, 8b is provided in each case, in order to prevent transmission of disturbance signals via the one or more data lines (11,12). The galvanic isolating component 8a, 8b is, for example, an optocoupler, a digital isolator, a so-called I-coupler, a print transformer or some other kind of transformer. The galvanic isolating components 8a, 8b are designed in such a manner that the desired disturbance resistance of the field device 1 is achieved.

Disturbance signals which occur on the power supply lines VCC, GND are eliminated via the filter elements 6; C1, C2. Filter elements 6; C1, C2 are also designed in such a manner that a desired disturbance resistance is achieved. In the illustrated case, a choke 6, in the form of an electrical current compensated choke, is integrated into the power supply lines VCC, GND. Depending on the case of application, it can, of course, be a non electrical current compensated choke, or it can be a ferrite choke. Capacitors C1, C2 are Y-capacitors, while capacitors C3, C4 are X-capacitors.

Figure 2A:
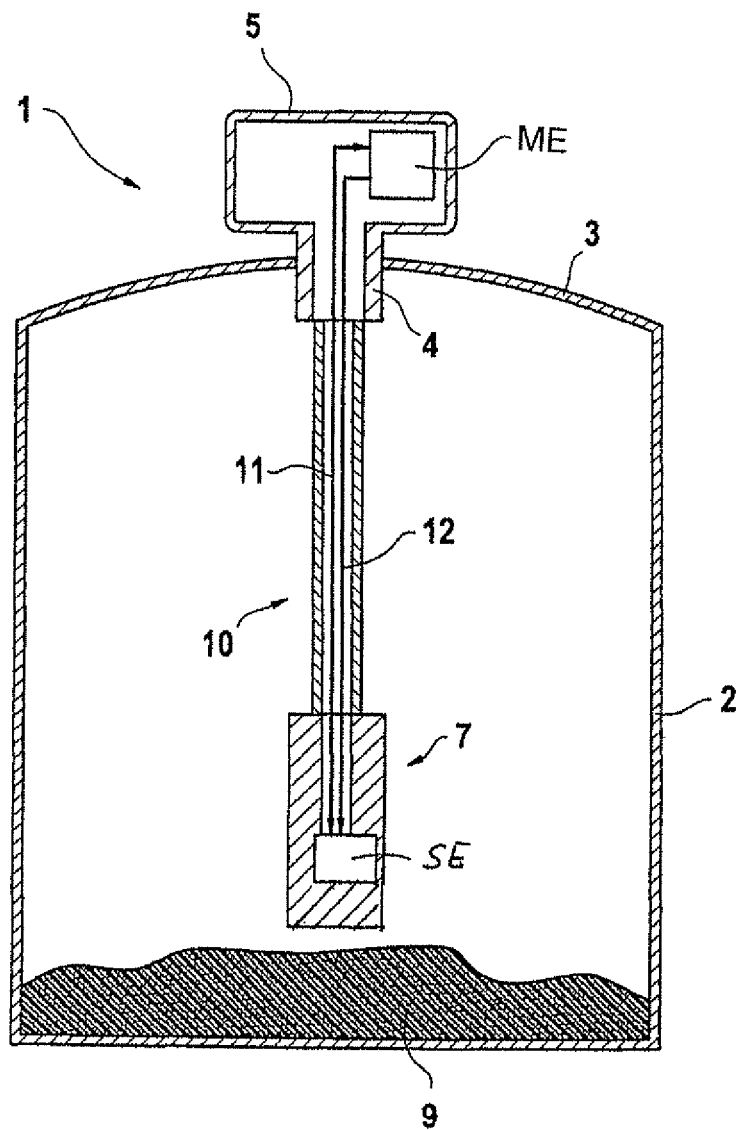
FIG. 2a is a schematic representation of a first embodiment of the apparatus of the invention in the case of a so-called cable variant with spatial isolation between the control/evaluation unit and the sensor.

FIG. 2a shows a schematic representation of a first embodiment of the apparatus of the invention 1, wherein the apparatus is embodied as a so-called cable variant. In the illustrated case, the apparatus of the invention 1 ascertains, for example, the limit-level of a fill substance 9 in the container 2, or the pressure in the container 2. Apparatus 1 is composed of a sensor 7, which is located in the process, a control/evaluation unit 5, which is mounted outside of the process in an opening 4 in the lid 3 of container 2, and a connection means 10, e.g. a cable, which connects sensor 7 with the evaluation unit 5.

The main electronics ME is associated with the control/evaluation unit 5, and the sensor electronics SE with sensor 7. Preferably, the main electronics ME associated with the control/evaluation unit 5 is a master processor, and the sensor electronics SE associated with the sensor 7 is a slave processor. Both processor units ME, SE communicate with one another via the data lines 11, 12. Depending on application, a unidirectional or bidirectional data exchange is possible via data lines 11, 12.

Into the at least one data line 11, 12, via which the main electronics ME and sensor electronics SE communicate, at least one galvanic isolating component 8a, 8b is integrated, which prevents the transmission of disturbance signals via the one or more data lines 11, 12. In supply lines VCC, GND, via which a power supply voltage VCC sufficient for operation of sensor is made available to sensor 7, filter means 6; C1, C2 are provided, which are designed in such a manner that predetermined requirements for the disturbance resistance of supply lines VCC, GND are fulfilled.

Figure 2B:
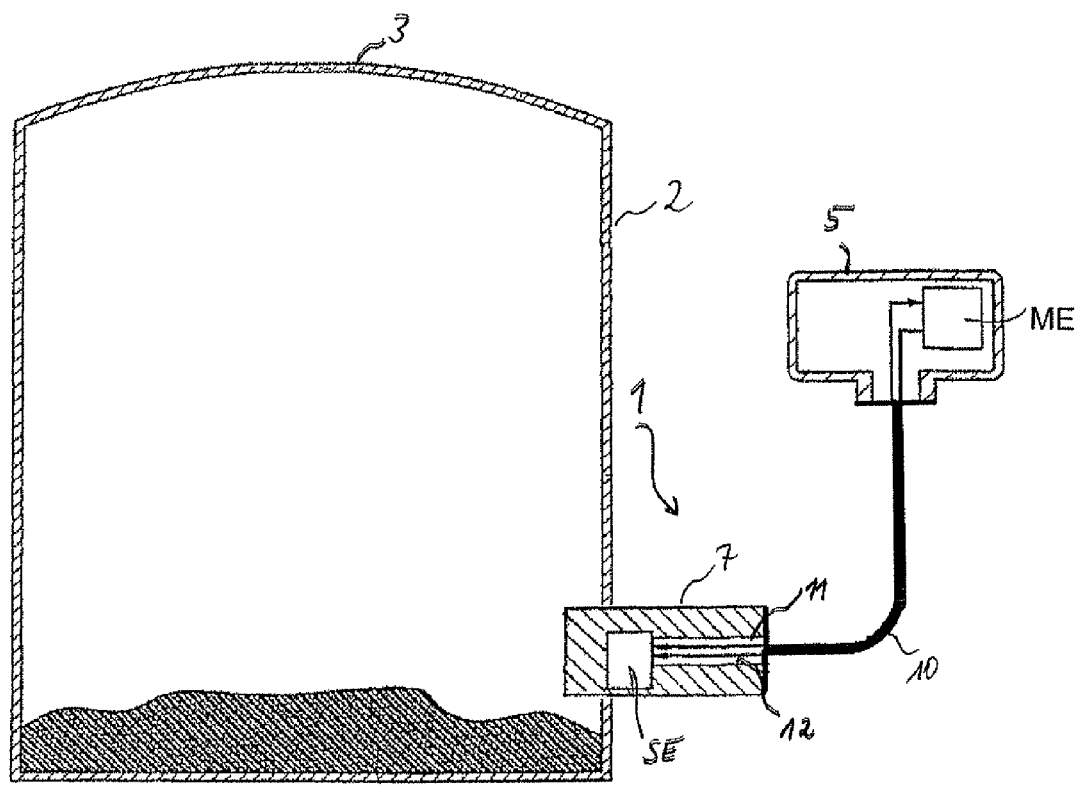
FIG. 2b is a schematic representation of a second embodiment of the apparatus of the invention in the case of a so-called cable variant with spatial isolation between the control/evaluation unit and the sensor.

FIG. 2b shows a schematic representation of a second embodiment of the apparatus of the invention. Also here, a cable variant with spatial isolation between the control/evaluation unit 5 and the sensor 7 is to be seen. Sensor 7, which, for example, is a pressure sensor, is secured in the wall of the container 2, while the control/evaluation unit or the measurement transmitter is separated via the connection means 10 from sensor 7, and therewith from the process.

Figure 3:
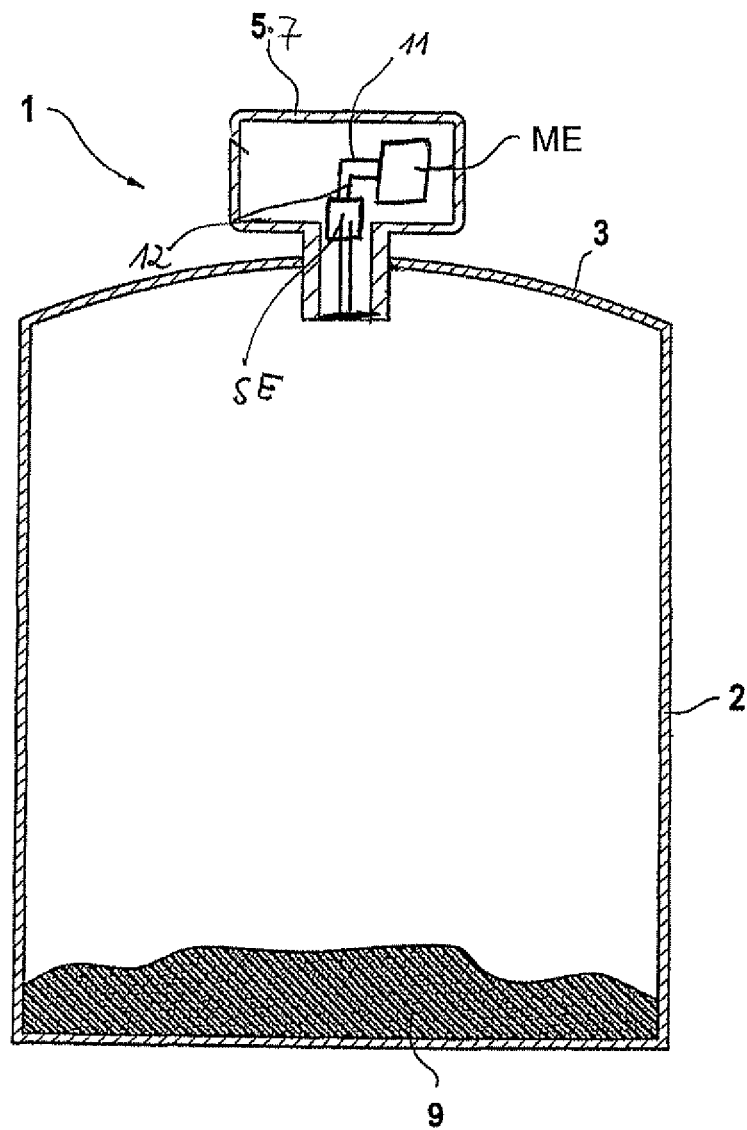
FIG. 3 is a schematic representation of an embodiment of the apparatus of the invention in the case of a compact device.

FIG. 3 shows the use of the apparatus of the invention in the case of a compact device, in the case of which the control/evaluation unit 5 and the sensor, like the main electronics ME and the sensor electronics SE, are arranged in one housing. In such case, the main electronics ME and the sensor electronics SE can be arranged on different circuit boards, or also on the same circuit board. Integrated into the at least one data line 11, 12 via which the main electronics ME and the sensor electronics SE communicate is at least one galvanic isolating component 8a, 8b, which prevents the transmission of disturbance signals via the one or more data lines 11, 12. In supply lines VCC, GND, via which a power supply voltage VCC sufficient for operation of sensor 7 is made available to sensor 7, filter means 6; C1 C2 are provided, which are designed in such a manner that predetermined requirements for the disturbance resistance of supply lines VCC, GND are fulfilled.

As already previously mentioned, the field device, whether it is embodied as a compact device or as a cable variant with a remote control/evaluation unit 5 and sensor 7, serves for determining and monitoring any desired process variable.

The invention claimed is:

1. An apparatus for reducing or minimizing disturbance signals in a field device of process automation, wherein the field device includes a control/evaluation unit and a sensor, comprising:
   at least one main electronics;
   at least one sensor electronics;
   at least one data line, via which said main electronics and said sensor electronics communicate, wherein said at least one data line is embodied in such a manner that it allows unidirectional and/or bidirectional data transmission between the control/evaluation unit and the sensor;
   at least one galvanic isolating component, which is integrated into said at least one data line and which prevents transmission of disturbance signals via said at least one data line;
   power supply lines without galvanic isolation, via which the main electronics and the sensor electronics are connected with one another; via which a power supply voltage sufficient for operation of the sensor is made available to the sensor; and
   filter means in the power supply lines, which are designed in such a manner that predetermined requirements for disturbance resistance of said power supply lines are fulfilled,
   wherein one or more capacitors are placed in front of and/or connected after said filter means, between a power supply line as well as to ground.

2. The apparatus as claimed in claim 1, wherein: said filter means comprise a single stage or a multi-stage filter.

3. The apparatus as claimed in claim 1, wherein: said filter means comprise electrical current compensated or non electrical current compensated choke means.

4. The apparatus as claimed in claim 1, wherein: said filter means and, respectively, a choke means are designed in such a manner that their corresponding resistance is minimal; and it is assured that corresponding voltage drops are in sum smaller than the power supply voltage to be made available by the control/evaluation unit.

5. The apparatus as claimed in claim 1, wherein: said galvanic isolating components comprise optocouplers, inductive couplers, circuit board transformers, transformers.

6. Apparatus as claimed in claim 1, wherein:
   the field device is a fill level measuring device, a pressure measuring device, a flow measuring device or an analytical measuring device designed for purposes of analyzing a liquid or gaseous medium.

7. Apparatus as claimed in claim 1, wherein: said main electronics of the control/evaluation unit and the sensor electronics are spatially separated from one another and are connected with one another via a connection means.

8. The apparatus as claimed in claim 1, wherein: in a compact device, said main electronics and said sensor electronics are arranged in one housing.

9. The apparatus as claimed in claim 8, wherein: said main electronics and said sensor electronics are arranged on different circuit boards, or on the same circuit board.

* * * * *